(12) United States Patent
Nihashi

(10) Patent No.: US 10,821,756 B2
(45) Date of Patent: Nov. 3, 2020

(54) PRINTER

(71) Applicant: TOSHIBA TEC KABUSHIKI KAISHA, Tokyo (JP)

(72) Inventor: Kiyotaka Nihashi, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 168 days.

(21) Appl. No.: 16/042,069

(22) Filed: Jul. 23, 2018

(65) Prior Publication Data

US 2019/0023037 A1   Jan. 24, 2019

(30) Foreign Application Priority Data

Jul. 24, 2017  (JP) .................................. 2017-142918

(51) Int. Cl.
| | | |
|---|---|---|
| *B41J 15/04* | (2006.01) | |
| *B41J 3/407* | (2006.01) | |
| *G06K 15/02* | (2006.01) | |
| *B41J 15/18* | (2006.01) | |
| *B41J 15/02* | (2006.01) | |
| *B65H 16/02* | (2006.01) | |
| *B65H 16/06* | (2006.01) | |

(52) U.S. Cl.
CPC .......... *B41J 15/042* (2013.01); *B41J 3/4075* (2013.01); *B41J 15/02* (2013.01); *B41J 15/18* (2013.01); *B65H 16/028* (2013.01); *B65H 16/06* (2013.01); *G06K 15/022* (2013.01); *G06K 15/024* (2013.01); *B65H 2801/12* (2013.01)

(58) Field of Classification Search
CPC ...................................................... B41J 15/042
USPC ....................................................... 101/407.1
See application file for complete search history.

(56) References Cited

U.S. PATENT DOCUMENTS

| 4,543,152 A * | 9/1985 | Nozaka ................ B65H 19/102 156/157 |
| 7,387,458 B2 * | 6/2008 | Monteith ............... B41J 3/4075 226/109 |
| 2008/0267684 A1 * | 10/2008 | Puigardeu .............. B41J 15/042 400/613 |
| 2012/0224017 A1 | 9/2012 | Nihashi |
| 2012/0224904 A1 | 9/2012 | Nihashi et al. |
| 2012/0224906 A1 | 9/2012 | Nihashi |
| 2017/0144458 A1 * | 5/2017 | Nihashi .................. B41J 3/4075 |
| 2017/0341430 A1 * | 11/2017 | Valles Casanova ..... B41J 13/10 |

FOREIGN PATENT DOCUMENTS

JP   2011-245870 A   12/2011

\* cited by examiner

*Primary Examiner* — Anthony H Nguyen
(74) *Attorney, Agent, or Firm* — Kim & Stewart LLP

(57) ABSTRACT

A printer includes a paper roll holder having a shaft, a paper roll storage section, and a print unit. The paper roll storage section has a first support configured to rotatably support the shaft of the paper roll holder when the paper roll holder is inserted into a shaft core of a paper roll, and a second support configured to rotatably support the shaft of the paper roll holder when the paper roll holder is not inserted into the shaft core of the paper roll and at a position where the paper roll holder abuts an outer circumference of the paper roll when the shaft of the paper roll holder is rotatably supported by the second support. The print unit is configured to form an image on paper to be supplied from the paper roll.

20 Claims, 12 Drawing Sheets

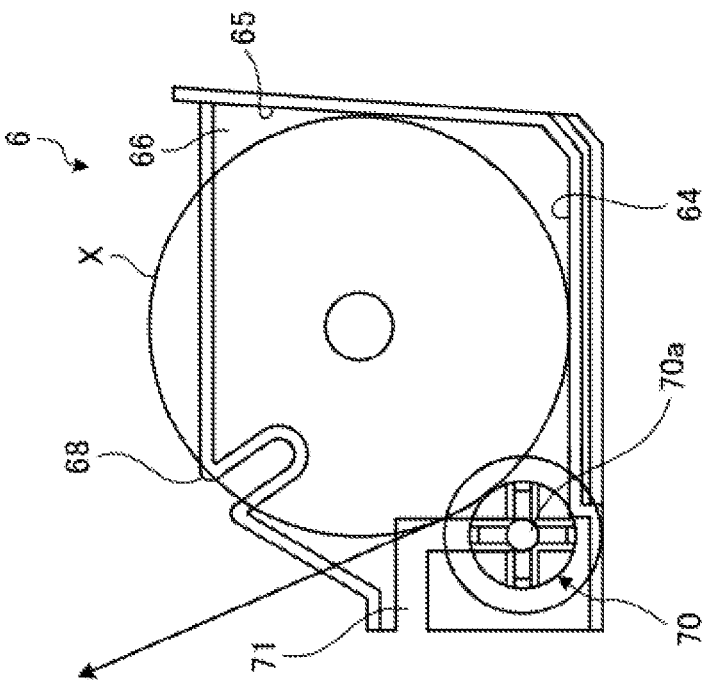
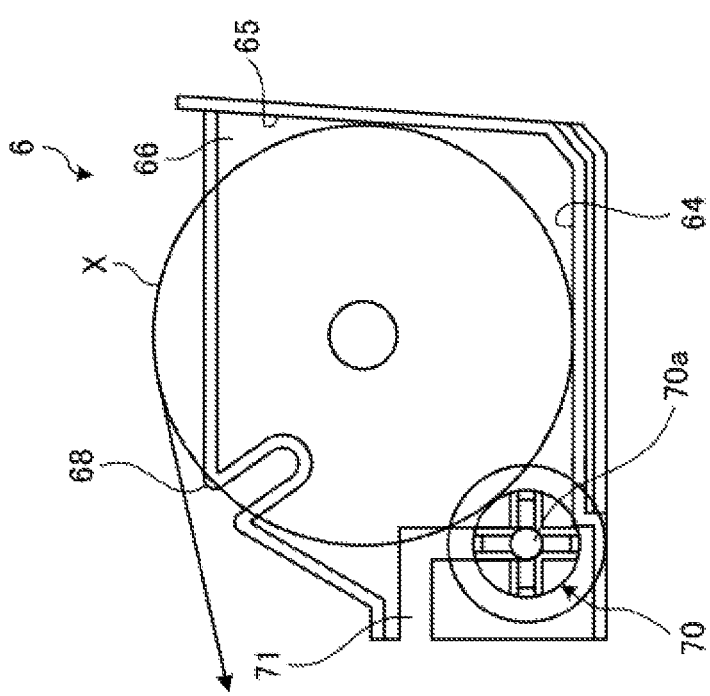

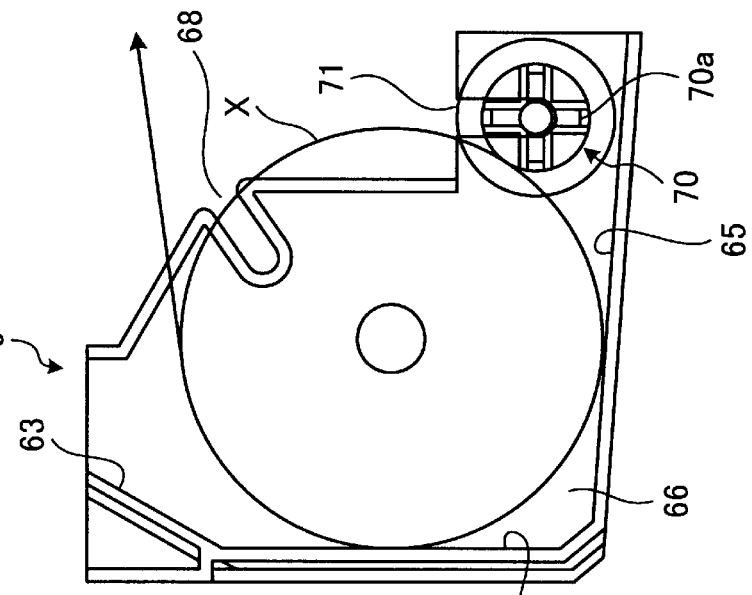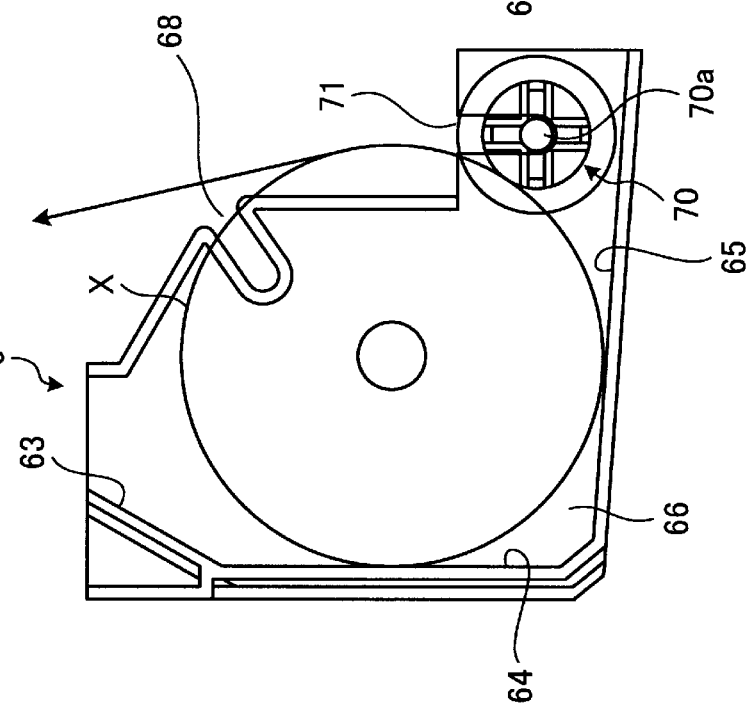

PRINTER

CROSS-REFERENCE TO RELATED APPLICATION

This application is based upon and claims the benefit of priority from Japanese Patent Application No. 2017-142918, filed Jul. 24, 2017, the entire contents of which are incorporated herein by reference.

FIELD

Embodiments described herein relate generally to a printer.

BACKGROUND

In the related art, there are two types of setting methods for setting a receipt paper, a label paper, or other types of paper wound in a roll shape (hereinafter, collectively refer to as "paper roll") in a printer.

A first method is a shaft core setting method where a shaft core of the paper roll is supported by a holding member provided in a paper storage section of the printer. A second method is a drop-in setting method where the paper roll is dropped into the paper storage section of the printer and an outer peripheral surface of the paper roll is supported with an inner peripheral surface of the paper storage section.

As described above, there are two types of setting methods for setting a paper roll in a printer because a diameter of the shaft core varies depending on types of paper rolls. For example, a diameter of a shaft core of a roll of a thermal paper is generally small. On the other hand, a diameter of a shaft core of a roll of a label paper is larger than that of the thermal paper.

A printer with a simple structure in which the above described two methods are selectable and the paper roll can be set according to either method is known. In such a printer according to the related art, when the paper roll is set by a drop-in setting method, the holding member is not used and may get lost.

DESCRIPTION OF THE DRAWINGS

FIGS. 6A and 6B are side views illustrating a drop-in type setting method.

FIGS. 14A and 14B are views illustrating Modification Example 5.

DETAILED DESCRIPTION

Embodiments provide a printer that is designed to reduce the risk of loss of the holding member such as when a drop-in type setting method is used.

In general, according to one embodiment, there is provided a printer including a paper roll holder having a shaft, a paper roll storage section, and a print unit. The paper roll storage section has a first support configured to rotatably support the shaft of the paper roll holder when the paper roll holder is inserted into a shaft core of a paper roll, and a second support configured to rotatably support the shaft of the paper roll holder when the paper roll holder is not inserted into the shaft core of the paper roll and at a position where the paper roll holder abuts an outer circumference of the paper roll when the shaft of the paper roll holder is rotatably supported by the second support. The print unit is configured to form an image on paper to be supplied from the paper roll.

Hereinafter, the printer according to the present embodiment will be described in detail with reference to the attached drawings. The embodiment is not limited by the embodiments described below.

Figure 1:
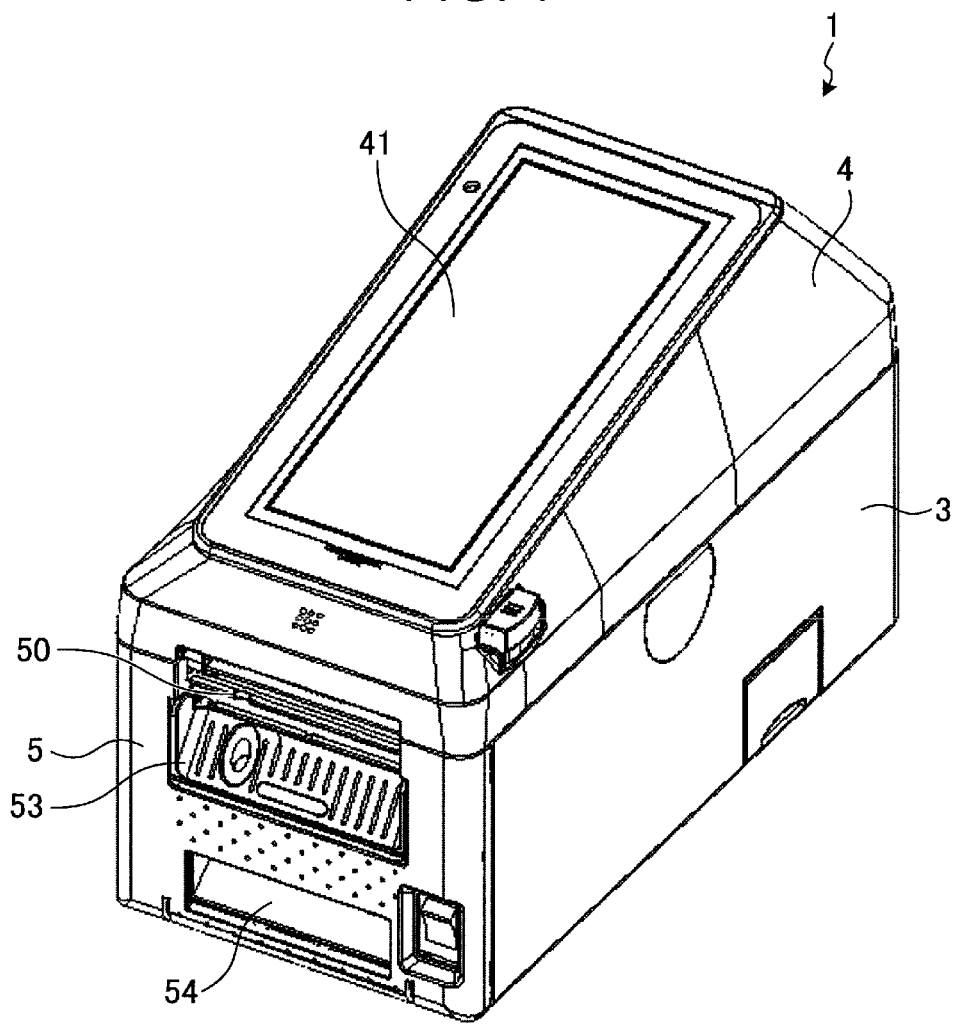
FIG. 1 is a perspective view of a printer according to an embodiment.
Figure 2:
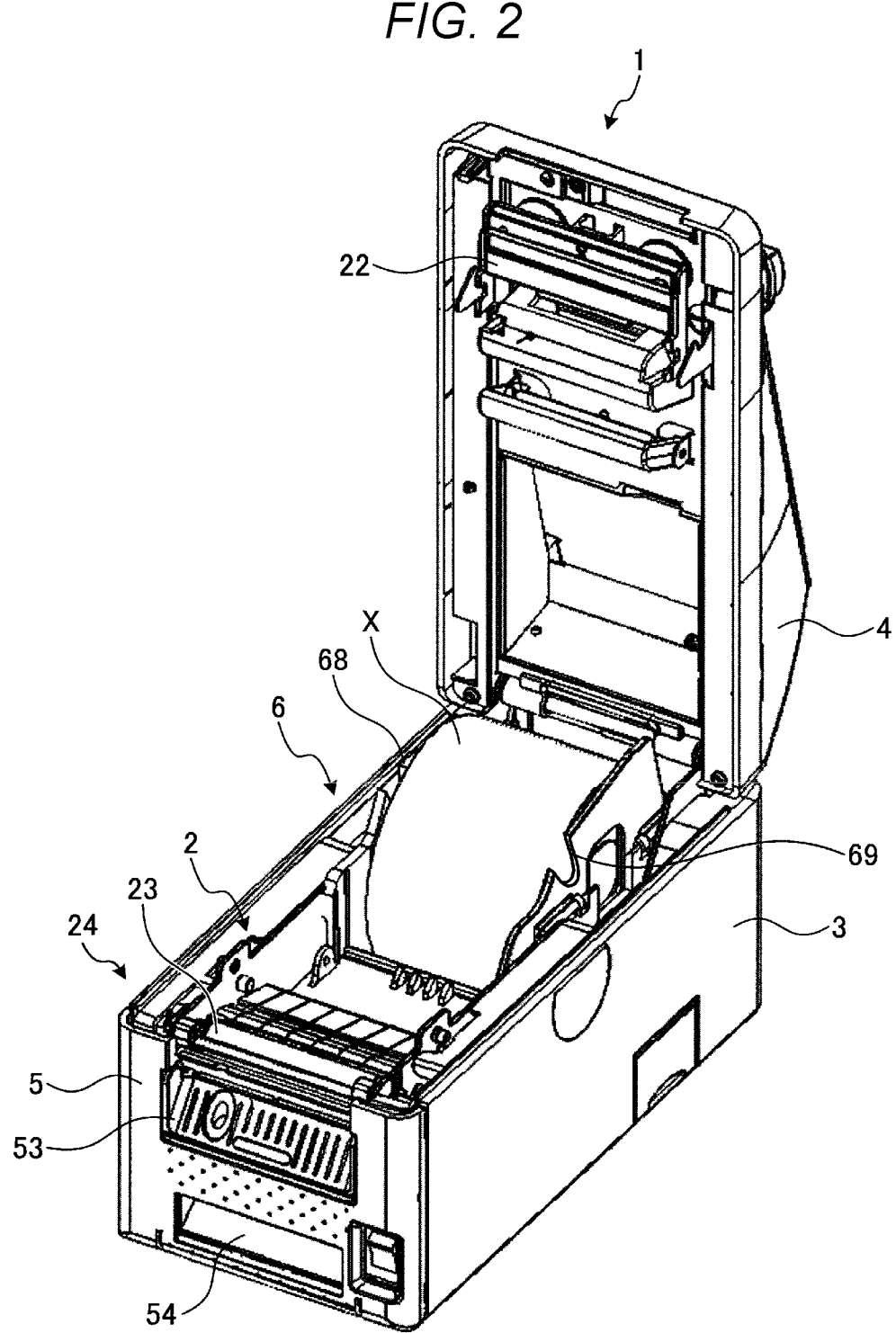
FIG. 2 is a perspective view illustrating a state in which an upper case of the printer is opened.

FIG. 1 is a perspective view of a printer 1 according to an embodiment, and FIG. 2 is a perspective view illustrating a state in which an upper case 4 of the printer 1 is opened.

The printer 1 includes a printer main body 2, a lower case 3, the upper case 4, and a front cover 5. The printer 1 further includes a paper storage section 6 detachably attached with respect to the lower case 3. The lower case 3, the upper case 4, and the front cover 5 cover the printer main body 2 and the paper storage section 6.

The paper storage section 6 is a container with an upper opening that stores and holds a paper roll X obtained by winding a belt-like paper in a roll shape. A receipt roll or a label roll are examples of the paper roll X. The receipt roll is formed by winding a belt-like receipt paper in a roll-shape. The label roll is formed by winding a mount on which label paper is attached with adhesive material in a roll-shape.

The lower case 3 is a rectangular parallelepiped case in which a top surface and a front surface thereof are opened. The top surface of the lower case 3 is covered by the upper case 4 that is openable and closable with respect to the lower case 3, and the front surface of the lower case 3 is covered by the front cover 5.

The upper case 4 is rotatably attached to the lower case 3. The upper case 4 opens and closes an opening of the lower case 3 with rotation thereof. The upper case 4 is provided with a touch panel display 41 provided on a top surface thereof. The touch panel display 41 receives input of various operations and displays the various information thereon.

A paper discharge port 50 that discharges a paper is provided between an upper end portion of the front cover 5 and a lower front end portion of the upper case 4.

The front cover 5 is provided with a paper discharge guide 53 and a tray paper discharge port 54. The paper discharge guide 53 guides the paper to be discharged. If the paper is the mount with a label and is issued by being separated, the tray paper discharge port 54 discharges the mount after the label is separated. The front cover 5 covers a front surface of the printer main body 2 in an openable and closable manner.

The printer main body 2 is provided with a print unit 24 that pulls out the paper from the paper roll X stored in the paper storage section 6 and performs printing thereon. The print unit 24 is provided with a thermal head 22 and a platen roller 23. The thermal head 22 is fixed on an inside surface of the upper case 4, and comes into close contact with the platen roller 23 in a state that the upper case 4 is closed with respect to the lower case 3.

The thermal head 22 includes a plurality of heating elements that are provided in parallel with each other, and performs printing on the paper pinched between the thermal head 22 and the platen roller 23 by heat from the heating elements.

Figure 5:
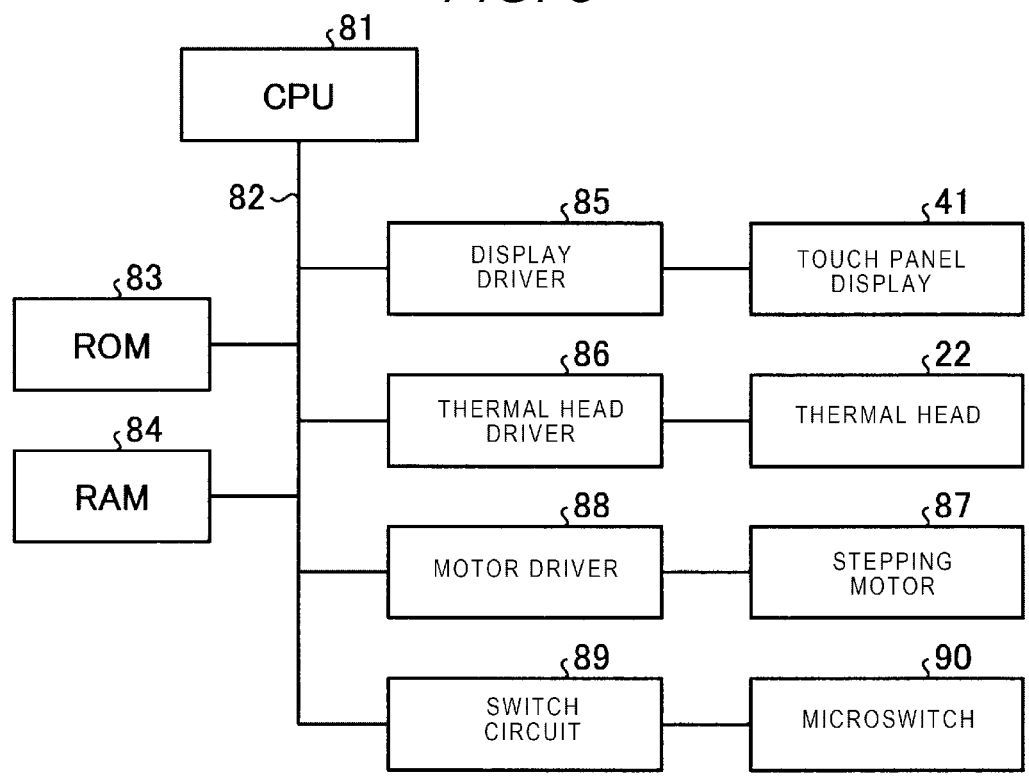
FIG. 5 is a block diagram of a control system of the printer.

The platen roller 23 is rotated by a transmission of a driving force of a stepping motor 87 as shown in FIG. 5 and transports the paper pinched between the platen roller 23 and the thermal head 22.

Next, the paper storage section 6 will be described in detail.

Figure 3:
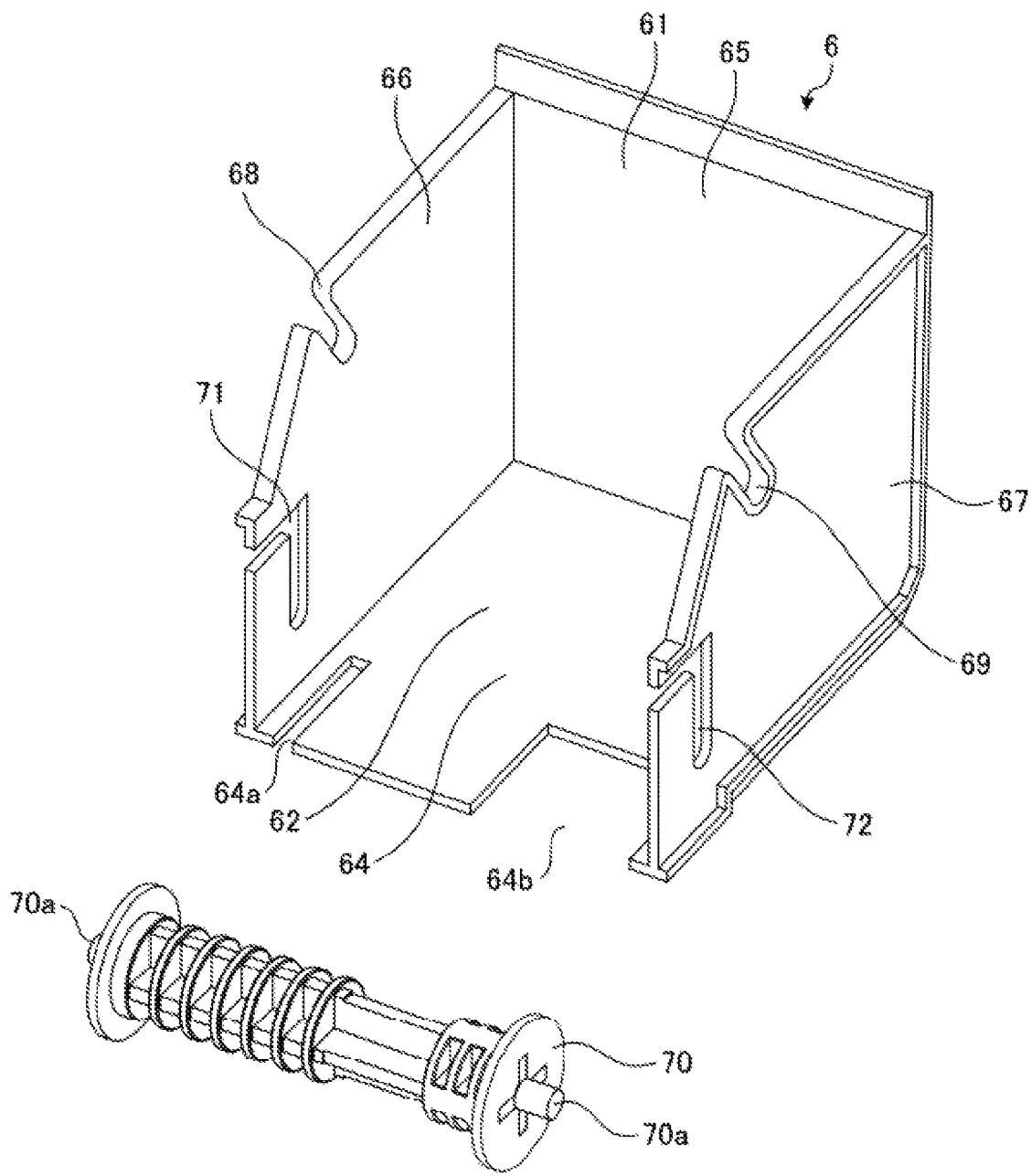
FIG. 3 is a perspective view illustrating a paper storage unit.

FIG. 3 is a perspective view illustrating the paper storage section 6. As illustrated in FIG. 3, the paper storage section 6 is formed in a container shape that has an upper opening portion 61. An interior space 62, which is a space for storing the paper roll X, is surrounded by a bottom wall 64, a rear wall 65, and side walls 66 and 67.

As illustrated in FIG. 3, the paper storage section 6 has grooves 68 and 69 formed at each upper portion of the side walls 66 and 67 for placing and rotatably supporting a holding member 70. Also, cutouts 64a and 64b are formed in the bottom wall 64 that can accept a pair of press portions 70e and 70f of the holding member 70 (shown in FIGS. 4A and 4B). When the paper roll X is a label roll, the grooves 68 and 69 rotatably support the paper roll X by hooking both ends of the holding member 70 inserted into the core of the paper roll X.

The grooves 68 and 69 are formed to have the same curvature with a slightly larger diameter compared to an outer diameter of a shaft 70a of the holding member 70 inserted into the paper roll X, so that the holding member 70 is rotatable in a state of being placed therein. The grooves 68 and 69 are not limited to the specific shape as long as it is possible to rotatably support the holding member 70.

As illustrated in FIG. 3, the paper storage section 6 has grooves 71 and 72 formed at a lower portion of the side walls 66 and 67 for placing and rotatably supporting the holding member 70. When the paper roll X is the receipt roll, the grooves 71 and 72 rotatably support the holding member 70 by hooking both ends of the holding member 70.

The grooves 71 and 72 are formed to have the same curvature with a slightly larger diameter compared to the outer diameter of a shaft 70a of the holding member 70, so that the holding member 70 is rotatable in a state of being placed. The grooves 71 and 72 may be formed into other shapes as long as it is possible to rotatably support the holding member 70.

In a vicinity of the grooves 71 and 72 of the paper storage section 6, a microswitch 90 (shown in FIG. 5) which detects placement of the holding member 70 with respect to the grooves 71 and 72 is provided.

The side wall 67 is movable in a direction towards and away from the side wall 66. The side wall 67 that moves in accordance with a width of the paper roll X securely positions the paper roll X in the width direction. The side walls 66 and 67 interpose the paper roll X therebetween.

The position of the side wall 67 may also be fixed as is the side wall 66. In this case, when using the paper roll X having a narrow width, an auxiliary side wall may be provided between the side wall 66 and the side wall 67.

Next, the holding member 70 will be described.

Figure 4A:
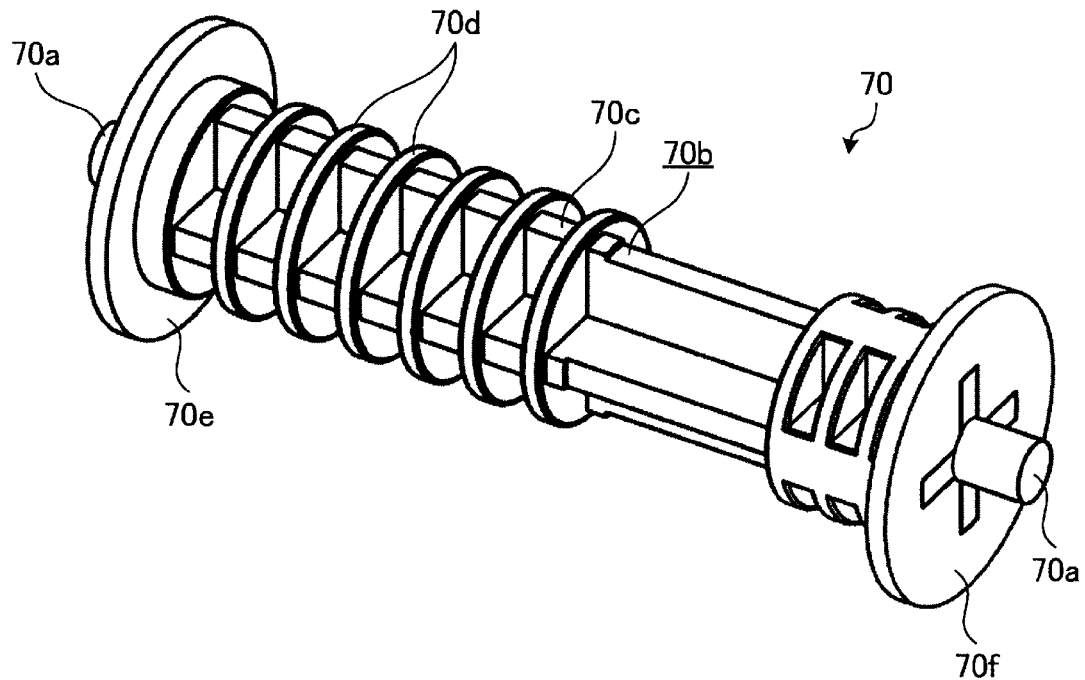
FIGS. 4A and 4B are perspective views of a holding member.
Figure 4B:
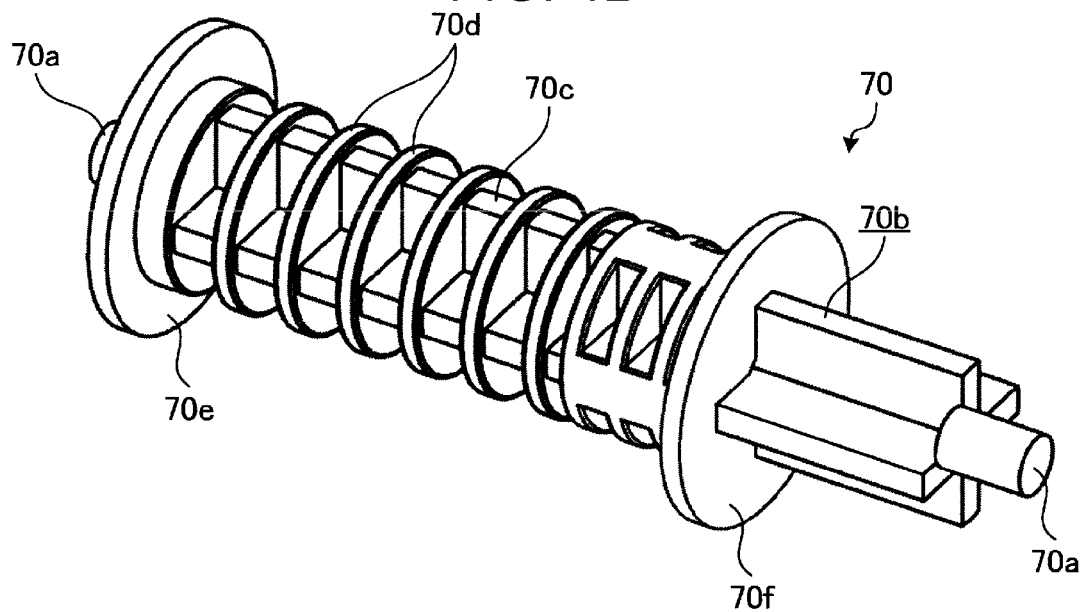

FIGS. 4A and 4B are perspective views of the holding member 70. As illustrated in FIGS. 4A and 4B, the holding member 70 is provided with the shafts 70a at both end portions of a core portion 70b. The grooves 71 and 72 rotatably support the holding member 70 by supporting the shaft 70a with grooves 71 and 72. In addition, the core portion 70b is provided with a longitudinal rib 70c having a cross sectional shape of cruciform shape and a disk-shaped circumferential rib material 70d extending in a plane direction orthogonal to the longitudinal rib 70c. By forming the core portion 70b in a lattice shape as shown in FIGS. 4A and 4B, weight of the holding member 70 is reduced and the holding member 70 is easily rotated. The diameter of the circumferential rib material 70d is set to be larger than the width of the longitudinal rib 70c.

As illustrated in FIGS. 4A and 4B, the holding member 70 is provided with a pair of press portions 70e and 70f. The press portion 70f is movable in a direction towards and away from the press portion 70e along the longitudinal rib 70c. The press portion 70f is moved in accordance with the width of the paper roll X to securely position the paper roll X in the width direction. The press portions 70e and 70f interpose the paper roll X therebetween. FIG. 4A is a view illustrating the holding member 70 when mounting the paper roll X having a wide width, and FIG. 4B is a view illustrating the holding member 70 when mounting the paper roll X having a narrow width.

Next, a control system of the printer 1 will be described.

FIG. 5 is a block diagram of the control system of the printer 1. As illustrated in FIG. 5, the printer 1 is provided with a central processing unit (CPU) 81 that performs operation control of various portions. The CPU 81 is connected to a read only memory (ROM) 83 storing a program and the like or a random access memory (RAM) 84 storing various types of data via a bus line 82. In addition, the CPU 81 is connected to a display driver 85 for controlling the touch panel display 41, a thermal head driver 86 for controlling the thermal head 22, a motor driver 88 for controlling the stepping motor 87 that rotationally drives the platen roller 23 and the like, a switch circuit 89 for receiving switch information of the microswitch 90 and the like, or the like via the bus line 82. A mode recognition function to be described later is executed under control of the CPU 81 based on the program stored in the ROM 83.

Next, a setting method of the paper roll X in the paper storage section 6 will be described.

As the setting method of the paper roll X in the paper storage section 6, there are a shaft holding type setting method that the shaft core is held by the holding member 70 and a drop-in type setting method that the shaft core is not held by the holding member 70.

Since the shape of the label roll in a plane direction orthogonal to its core is easily deformed if the label roll is left for long period of time in a state where the shaft core of the label roll is laid sideways, when the label roll is used in the drop-in type setting method, the label roll may be deformed so that the label roll cannot be pulled out or hard to be pulled out. For this reason, when the paper roll X is the label roll, the shaft holding type setting method is used.

Since the receipt roll is wound more tightly than the label roll, the shape of the receipt roll in the plane direction orthogonal to its core deforms very little even if the receipt roll is left for long period of time in a state where the shaft core of the receipt roll is laid sideways. In addition, the receipt roll has high replenishing frequency. For this reason, when the paper roll X is the receipt roll, the drop-in type setting method is used.

First, the drop-in type setting method when the paper roll X is the receipt roll will be explained. FIGS. 6A and 6B are side views illustrating the drop-in type setting method. FIG. 6A is a view illustrating a case of pulling out the paper from the bottom and FIG. 6B is a view illustrating a case of pulling out the paper from the top.

As illustrated in FIGS. 6A and 6B, a user respectively places the shafts 70a of the holding member 70 having the press portion 70f moved in accordance with the width of the paper roll X into the grooves 71 and 72, when the paper roll X is the receipt roll. At this time, the press portions 70e and 70f of the holding member 70 are located within the cutouts 64a and 64b of the bottom wall 64. In addition, the user moves the side wall 67 in accordance with the width of the paper roll X when the paper roll X is the receipt roll. In this state, the paper roll X is stored in the paper storage section 6 by being dropped into the interior space 62 from the opening portion 61. After dropping the paper roll X into the interior space 62, the press portion 70f and the side wall 67 may be moved in accordance with the width of the paper roll X.

The holding member 70 placed in the grooves 71 and 72 becomes a roller that abuts on the paper roll X, in a state where the paper roll X is stored in the paper storage section 6, and is rotated by the rotation of the paper roll X. In other words, the holding member 70 reduces friction between an outer peripheral surface of the paper roll X and an inside surface of the paper storage section 6 to make the rotation of the paper roll X easier and smoothly send out the paper.

In this case, since the diameter of the circumferential rib material 70d of the holding member 70 is set to be longer than the width of the longitudinal rib 70c, the paper roll X does not contact the longitudinal rib 70c but contacts only the circumferential rib material 70d. Accordingly, the holding member 70 is less likely to damage the surface of the paper roll X.

When the drop-in type setting method is used, the paper roll X may be lifted from the bottom of the paper storage section 6 when the paper is pulled out as the diameter decreases with consumption of the paper. However, in the paper storage section 6, movement of the paper roll X having a small diameter in a paper feeding direction is regulated by moving the press portion 70f and the side wall 67 to interpose the paper roll X therebetween in the width direction. Furthermore, by providing the holding member 70 near the front of the interior space 62, the paper roll X can be taken in and taken out easily.

In the printer of related art, various structures were proposed to meet various needs, and there are cases that removable components are used in the structure. In this case, the removed and stored component may get lost, and which causes an inconvenience that a function of the removable components cannot be used. In order to prevent this inconvenience, the holding member 70 is configured to be attachable to the grooves 71 and 72 without removing the holding member 70 from the paper storage section 6 in the case of the drop-in type setting method. In other words, with the printer 1 of the embodiment, inadvertent loss of the holding member 70 is prevented.

In particular, in the present embodiment, the holding member 70 is disposed at a position necessary for smoothly pulling out and transporting the paper of the paper roll X. In other words, when the holding member 70 is not disposed in the grooves 71 and 72, since the paper of the paper roll X cannot be pulled out and transported smoothly, the user can notice that the holding member 70 is not placed in the grooves 71 and 72.

Figure 7A:
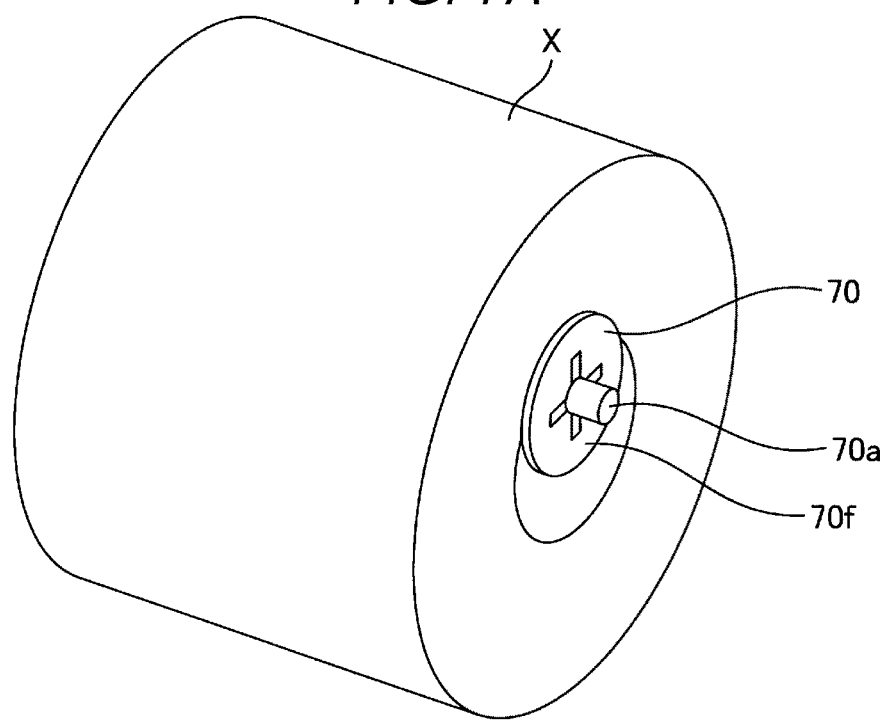
FIGS. 7A and 7B are perspective views illustrating a shaft holding type setting method.
Figure 7B:
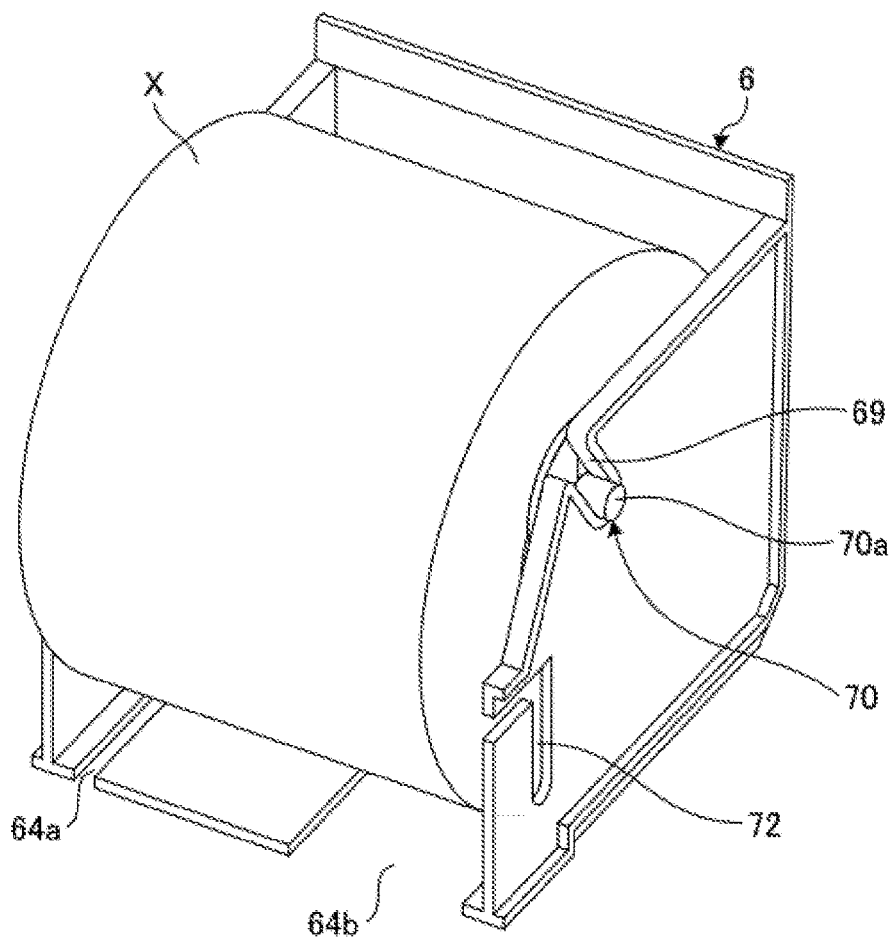

Next, the shaft holding type setting method when the paper roll X is the label roll will be explained. FIGS. 7A and 7B are perspective views illustrating the shaft holding type setting method. FIG. 7A is a view illustrating a state that the holding member 70 is inserted into the shaft core of the paper roll X and FIG. 7B is a view illustrating a state that the shaft 70a of the holding member 70 is placed in the grooves 68 and 69.

As illustrated in FIGS. 7A and 7B, the user inserts the holding member 70 into the shaft core of the paper roll X, positions the press portion 70f so as to abut on the end surface of the paper roll X, and interposes the paper roll X with the press portion 70e between the both side ends thereof. Next, the user places the shafts 70a of the holding member 70 in a state of interposing the paper roll X between the both side ends thereof at the grooves 68 and 69. As a result, the paper roll X as a label roll can be ready to be drawn out.

The user may move the side wall 67 according to the width of the paper roll X.

Next, the mode recognition function executed by the printer 1 will be described.

Figure 8:
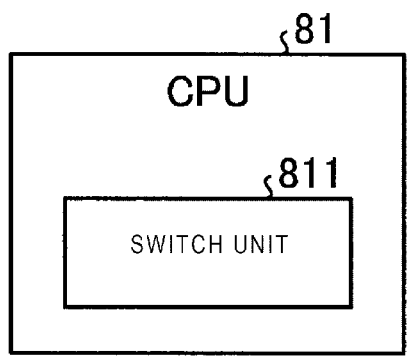
FIG. 8 is a block diagram of a CPU of the printer.

FIG. 8 is a block diagram of the printer 1. As illustrated in FIG. 8, the CPU 81 of the printer 1 is programmed to function as a switch unit 811 by executing the program stored in the ROM 83.

When the microswitch 90 detects that the holding member 70 is supported by the second support structure, the switch unit 811 switches the print unit 24 to high speed printing.

Figure 9:
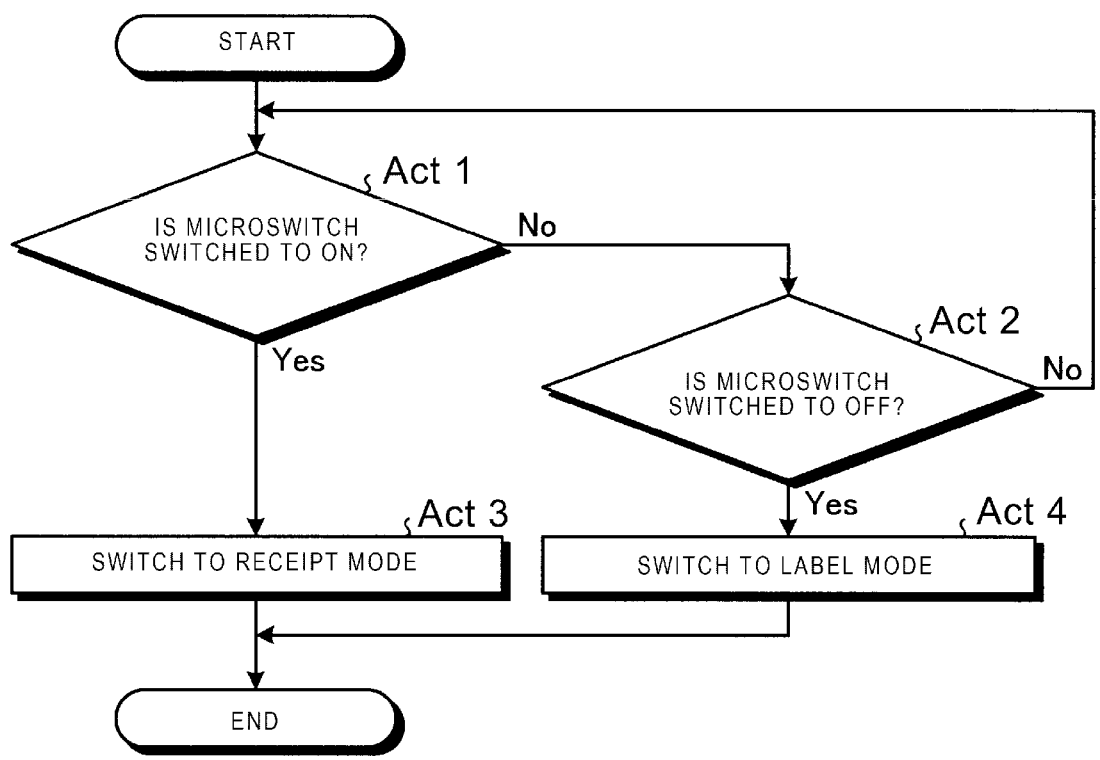
FIG. 9 is a flowchart illustrating a flow of a mode switch process carried out by a switch unit of the CPU.

Here, FIG. 9 is a flowchart illustrating a flow of a mode switch process by the switch unit 811. As illustrated in FIG. 9, when the switch unit 811 detects that the microswitch 90 is turned on (Yes in Act 1), the CPU 81 determines that the paper roll X is the receipt roll and the holding member 70 is positioned in the grooves 71 and 72, and switches to a receipt mode (Act 3).

On the other hand, when the switch unit 811 does not detect that the microswitch 90 is turned on (No in Act 1, Yes in Act 2), the CPU 81 determines that the paper roll X is the label roll and the holding member 70 is removed from the grooves 71 and 72 and positioned in the grooves 68 and 69, and switches to a label mode (Act 4). By doing so, it is possible to automatically switch from the label mode to the receipt mode, or from the receipt mode to the label mode. In general, the receipt mode is high speed printing compared to the label mode.

Modification Example 1

Figure 10:
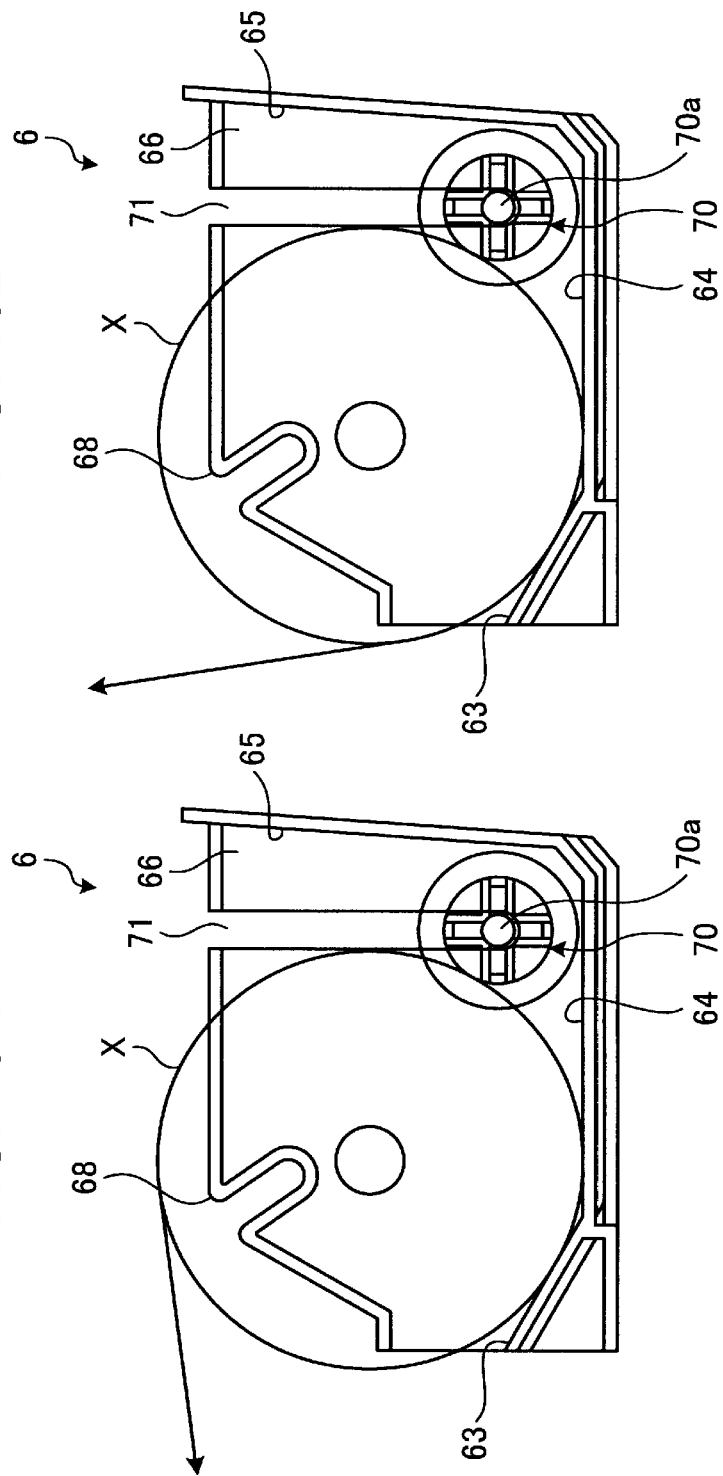
FIGS. 10A and 10B are views illustrating Modification Example 1.

FIGS. 10A and 10B are views illustrating Modification Example 1. FIG. 10A is a view illustrating a case of pulling out the paper from the top and FIG. 10B is a view illustrating a case of pulling out the paper from the bottom. The printer 1 of the present embodiment is provided with the grooves 71 and 72 at the vicinity of a front wall 63 of the paper storage section 6 and a lower portion of the side walls 66 and 67, but it is not limited thereto. For example, as illustrated in FIGS. 10A and 10B, the grooves 71 and 72 may be provided at a vicinity of the rear wall 65 of the paper storage section 6 and a lower portion of the side walls 66 and 67. In this case, the position of the microswitch 90 changes. According to the embodiment, the holding member 70 placed in the grooves 71 and 72 is a roller that abuts on the paper roll X, in a state where the paper roll X is stored in the paper storage section 6, and is driven by the rotation of the paper roll X. In other words, the holding member 70 reduces the friction between the outer peripheral surface of the paper roll X and the inside surface of the paper storage section 6 to make the rotation of the paper roll X easier and smoothly send out the paper.

Modification Example 2

Figure 11:
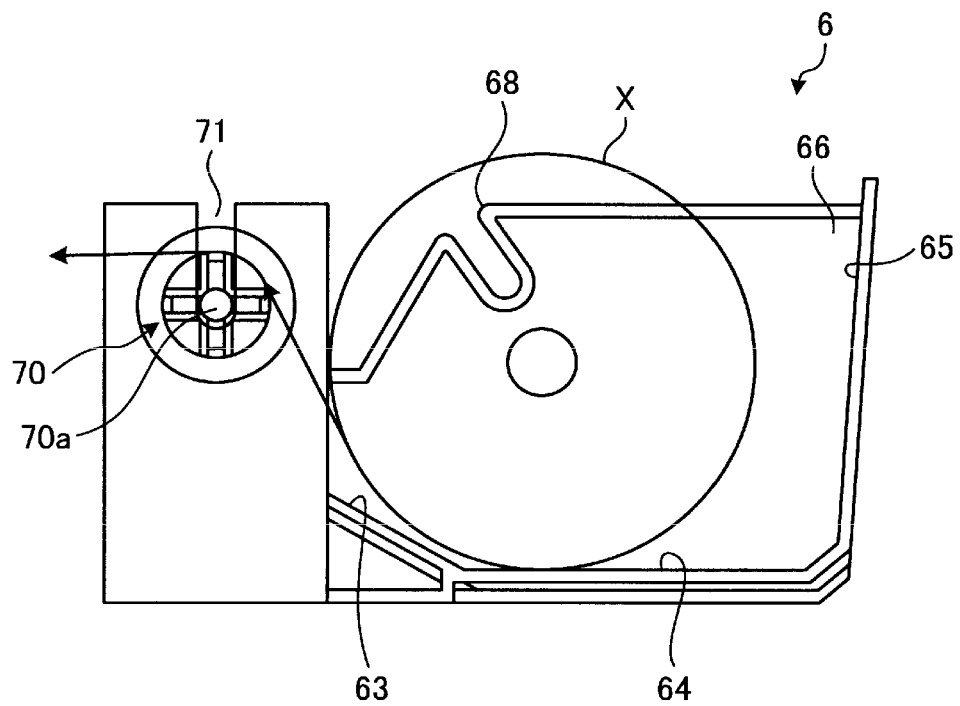
FIG. 11 is a view illustrating Modification Example 2.

FIG. 11 is a view illustrating Modification Example 2. For example, as illustrated in FIG. 11, the grooves 71 and 72 may be provided at the vicinity of the front wall 63 of the paper storage section 6 and the upper portions of the side walls 66 and 67. In this case, the position of the microswitch 90 changes. According to this embodiment, the holding member 70 placed in the grooves 71 and 72 smoothly sends out the paper by being driven by the rotation of the paper roll X.

Modification Example 3

Figure 12:
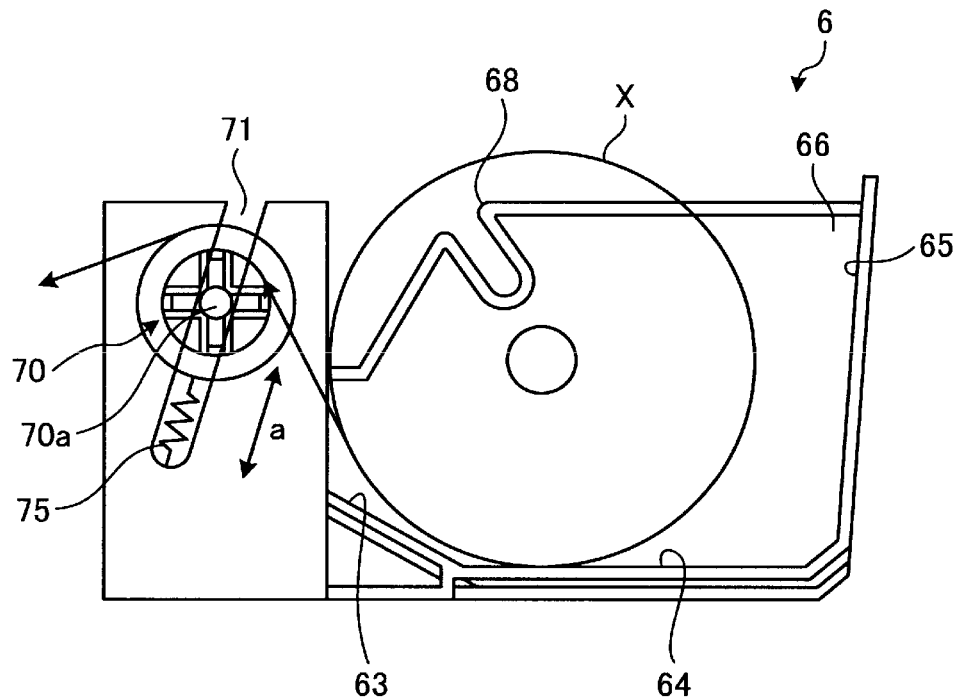
FIG. 12 is a view illustrating Modification Example 3.

FIG. 12 is a view illustrating Modification Example 3. As illustrated in FIG. 12, the grooves 71 and 72 may be provided at the vicinity of the front wall 63 of the paper storage section 6 and the upper portions of the side walls 66 and 67, and the holding member 70 placed in the grooves 71 and 72 may be pressed upward by a spring 75. According to this embodiment, the holding member 70 placed in the grooves 71 and 72 and pressed upward smoothly sends out the paper by being rotated by the rotation of the paper roll X and functioning as a damper that moves in a direction a to give a constant tension to the paper roll X.

Modification Example 4

Figure 13:
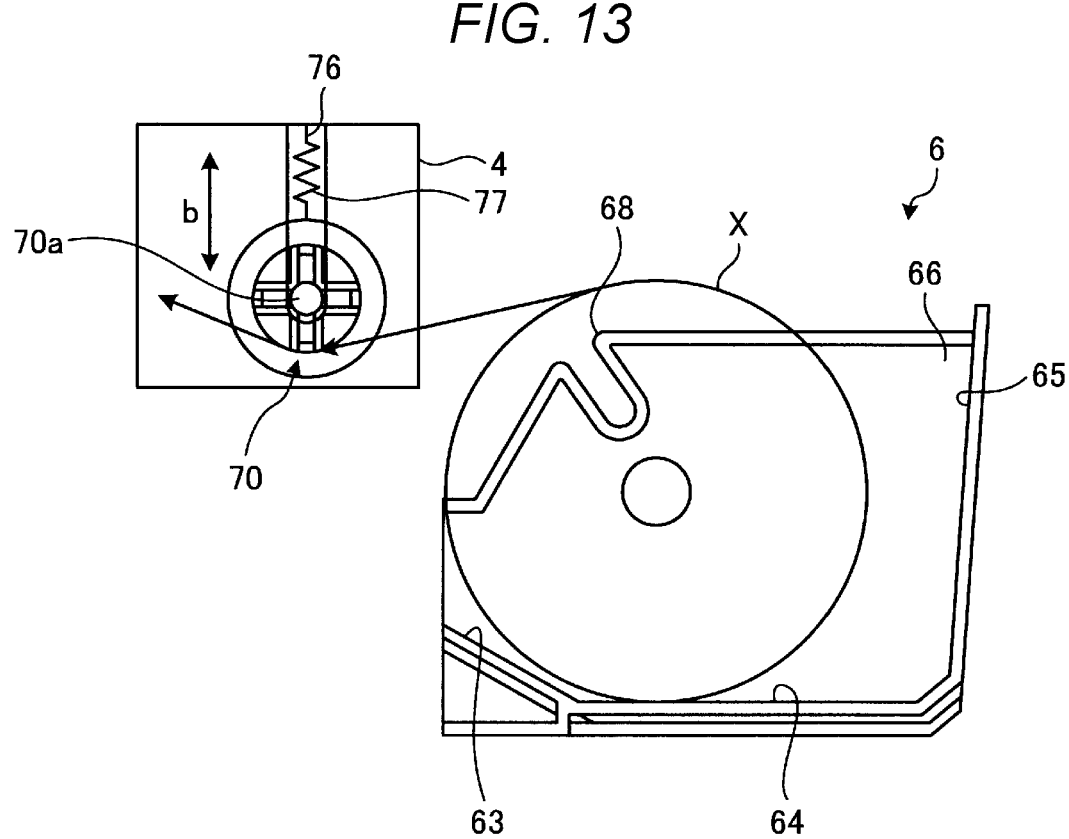
FIG. 13 is a view illustrating Modification Example 4.

FIG. 13 is a view illustrating Modification Example 4. As illustrated in FIG. 13, instead of the grooves 71 and 72, a holding portion 76 of the holding member 70 is provided at the upper case 4, and the holding member 70 held by the holding portion 76 of the upper case 4 may be pressed downward by a spring 77. According to this embodiment, the holding member 70 held by the holding portion 76 of the upper case 4 and pressed downward smoothly sends out the paper by being rotated by the rotation of the paper roll X and functioning as a damper that moves in a direction b to give a constant tension to the paper roll X.

Modification Example 5

FIGS. 14A and 14B are views illustrating Modification Example 5. FIG. 14A is a view illustrating a case of pulling out the paper from the bottom and FIG. 14B is a view illustrating a case of pulling out the paper from the top. As illustrated in FIGS. 14A and 14B, when using the printer 1 vertically, the grooves 71 and 72 may be provided at the vicinity of the rear wall 65 of the paper storage section 6 and the upper portions of the side walls 66 and 67. In this case, the position of the microswitch 90 changes. According to this embodiment, the holding member 70 placed in the grooves 71 and 72 is a roller that abuts on the paper roll X, in a state where the paper roll X is stored in the paper storage section 6, and is driven by the rotation of the paper roll X. In other words, the holding member 70 reduces the friction between the outer peripheral surface of the paper roll X and the inside surface of the paper storage section 6 make the rotation of the paper roll X easier and smoothly send out the paper.

The program executed by the printer 1 of the present embodiment may be provided in an installable format or an executable format recorded on a computer readable recording medium such as a CD-ROM, a flexible disc (FD), a CD-R, and a digital versatile disk (DVD) and provided.

The program executed by the printer 1 of the present embodiment may be provided by being stored on a computer connected to a network such as Internet and downloaded through the network. The program executed by the printer 1 of the present embodiment may be provided or distributed through a network such as Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A printer comprising:
a paper roll holder having a shaft;
a paper roll storage section having a first support configured to rotatably support the shaft of the paper roll holder when the paper roll holder is inserted into a shaft core of a paper roll, and a second support configured to rotatably support the shaft of the paper roll holder when the paper roll holder is not inserted into the shaft core of the paper roll and at a position where the paper roll holder abuts an outer circumference of the paper roll when the shaft of the paper roll holder is rotatably supported by the second support; and
a print unit configured to form an image on paper to be supplied from the paper roll.
2. The printer according to claim 1, wherein the paper roll storage section is defined by a bottom wall, a pair of side walls, and a rear wall, and each of the first and second supports comprises a pair of opposing grooves on the side walls.
3. The printer according to claim 2, wherein the second support is located at a front portion of the side wall.
4. The printer according to claim 2, wherein the second support is located adjacent the rear wall.
5. The printer according to claim 4, wherein the second support is located adjacent the bottom wall.
6. The printer according to claim 4, wherein the second support is located at a upper portion of the side walls.
7. The printer according to claim 1, wherein the paper roll holder includes a plurality of disk-shaped plates arranged along a length thereof, outer periphery of the disk-shaped plates abutting the paper roll when the shaft of the paper roll holder is rotatably supported by the second support.
8. The printer according to claim 7, wherein the paper roll holder further includes a pair of circumferential side guides between which the paper roll is accommodated.
9. The printer according to claim 8, wherein at least one of the circumferential side guides is movable towards and away from the other to accommodate paper rolls of different widths therebetween.
10. The printer according to claim 1, further comprising:
a microswitch configured to detect a placement of the shaft of the paper roll holder in either the first support or the second support.
11. The printer according to claim 10, further comprising:
a processor configured to set a speed of printing based on a detection signal from the microswitch.

12. A printer comprising:
a lower case;
an upper case installed on the lower case to be openable and closable with respect to the lower case;
a paper roll storage section;
a paper roll holder having a shaft;
a first support configured to rotatably support the shaft of the paper roll holder when the paper roll holder is inserted into a shaft core of a paper roll;
a second support configured to rotatably support the shaft of the paper roll holder when the paper roll holder is not inserted into the shaft core of the paper roll and at a position where the paper roll holder abuts paper of the paper roll when the shaft of the paper roll holder is rotatably supported by the second support; and
a print unit configured to form an image on paper to be supplied from the paper roll.

13. The printer according to claim 12, wherein the paper roll storage section is defined by a bottom wall, a pair of side walls, and a rear wall, and the second support comprises a pair of opposing grooves on the side walls.

14. The printer according to claim 12, wherein the second support is located where the paper roll holder, when the shaft of the paper roll holder is rotatably supported by the second support, abuts paper supplied from the paper roll and not an outer circumference of the paper roll.

15. The printer according to claim 14, wherein the second support includes a spring against which the shaft of the paper roll holder is supported when the shaft of the paper roll holder is rotatably supported by the second support.

16. The printer according to claim 15, wherein the second support is located in the lower case between the paper roll storage section and the printing unit.

17. The printer according to claim 14, wherein the second support is located in the upper case.

18. The printer according to claim 12, wherein the paper roll holder includes a plurality of disk-shaped plates arranged along a length thereof, outer periphery of the disk-shaped plates abutting the paper of the paper roll when the shaft of the paper roll holder is rotatably supported by the second support.

19. The printer according to claim 18, wherein the paper roll holder further includes a pair of circumferential side guides between which the paper roll is accommodated.

20. The printer according to claim 19, wherein at least one of the circumferential side guides is movable towards and away from the other to accommodate paper rolls of different widths therebetween.

* * * * *